United States Patent [19]
Potts et al.

[11] Patent Number: 5,911,925
[45] Date of Patent: Jun. 15, 1999

[54] APPARATUS AND METHOD FOR POSITIVE MOLDING BRAKE FRICTION PADS WITH ADJUSTABLE DIE CAVITY DEPTH

[75] Inventors: Kent Potts, Athens; Todd Sayres, Hull; Robinson Chauvot, Athens, all of Ga.

[73] Assignee: AlliedSignal Inc., Morristown, N.J.

[21] Appl. No.: 08/918,232

[22] Filed: Aug. 25, 1997

[51] Int. Cl.[6] .................................................. B29C 43/58
[52] U.S. Cl. .......................................... 264/40.5; 425/150
[58] Field of Search .................................. 264/40.5, 109; 425/150

[56] References Cited

U.S. PATENT DOCUMENTS

| | | | |
|---|---|---|---|
| 4,923,383 | 5/1990 | Kurumaji et al. | 425/150 |
| 5,336,074 | 8/1994 | Kashiwa et al. | 425/149 |
| 5,547,360 | 8/1996 | Yokoyama | 425/150 |

*Primary Examiner*—Mary Lynn Theisen
*Attorney, Agent, or Firm*—Paul L. Marshall

[57] ABSTRACT

A method and apparatus for manufacturing brake friction pads which includes a die having a cavity adapted to receive compressible friction material, a punch adapted to fit within the die cavity, sensing means fir determining the position of the die relative to the punch and means for automatically adjusting the position in response to a) the sensing means, b) operator input and/or c) characteristics of the friction material in the cavity, the desired compressed friction material or both.

21 Claims, 3 Drawing Sheets

APPARATUS AND METHOD FOR POSITIVE MOLDING BRAKE FRICTION PADS WITH ADJUSTABLE DIE CAVITY DEPTH

FIELD OF THE INVENTION

This invention relates to the manufacture of brake friction pads from compressible friction material compositions.

BACKGROUND OF THE INVENTION

Friction brake pads are usually manufactured by processes involving some type of positive molding of the friction material in a press, often accompanied and/or followed by heating of the material in order to cure the resinous binder(s) in the composition. Although various types of molding processes and apparatus, such as flash molding of pre-compacted pads in a tray mold, have been used, it is becoming more desirable to use one-up positive molding processing where a fluid-displaceable press ram applies a known pressure and temperature to the friction material in the die mold in order provide a more uniform product. However, unlike many previous commercial one-up positive molding where the same part made out the same material is reproduced over and over, it is now becoming more desirable in the manufacture of friction brake pads to produce relatively small lots of products of different shapes and sizes, and often different compositions. This can be accomplished by using a variety of dies having different cavity configurations, but all adapted to be used on a single press apparatus.

Although the use of dies having different cavity configurations allows for the manufacture of a variety of different brake pads, it can also impart substantial inefficiencies to the manufacturing process. Moreover, the varying properties of the different compressible friction material compositions can also lead to inefficiencies and other problems in the manufacturing process. Specifically, if a relatively thin brake friction pad is to be made, or if a friction material composition having relatively high bulk density prior to molding is used (so that relatively low compaction will take place during molding), the die cavity will not be filled to the top, but will instead be only partially filled. This leads to inefficiency in the manufacturing process, as the ram has to compress the die tool through any unused die cavity depth, which increases the cycle time of the process. Additionally, it is difficult to physically level the compressible friction material in the die cavity if the surface to be leveled is down in the die cavity recess.

SUMMARY OF THE INVENTION

This problem is addressed by utilizing a controllably adjustable die height that can be adjusted so that the, dependent on operator input (based on, for example, the desired part thickness), the position that the die is already in, or the characteristics or amount of compressible friction material to be introduced into the die cavity.

According to the present invention, there is provided an apparatus comprising
(A) a press frame,
(B) a press cylinder unit mounted on the press frame, comprising
  (1) a cylinder, and
  (2) a press ram that is fluid-displaceable within the cylinder, and
(C) a mold unit mounted on the press frame comprising
  (1) a die having a cavity adapted to receive compressible friction material, the die being movable in the same direction as the action of the fluid-displaceable press ram,
  (2) a punch adapted to fit within the die cavity, and
  (3) sensing means for determining the position of the die relative to the punch, and
  (4) means for automatically adjusting the position of the die relative to the punch in response to input from one or more of:
    (a) the sensing means (C)(3) for determining the position of the die relative to the punch,
    (b) operator input,
    (c) characteristics or amount of either the compressible friction material in the die cavity, the desired compressed friction material, or both.

In addition, the present invention also provides a method for manufacturing friction brake pads comprising the steps of
(i) providing a compressible friction material for introduction into a die cavity in a mold unit comprising
  (1) a die having a cavity adapted to receive the compressible friction material, the die being movable in the same direction as the action of a fluid-displaceable press ram to be located in proximity to the die, and
  (2) a punch adapted to fit within the die cavity,
(ii) determining the position of the die relative to the punch,
(iii) automatically adjusting the position of the die relative to the punch in response to input from one or more of:
  (a) the position of the die relative to the punch determined in step (ii),
  (b) operator input,
  (c) characteristics or amount of either the compressible friction material in the die cavity, the desired compressed friction material, or both,
(iv) introducing the compressible friction material into the die cavity,
(v) positioning the mold unit in proximity below the fluid-displaceable press ram,
(vi) compressing the compressible friction material in the die cavity against the punch with the fluid-displaceable press ram, and
(vii) removing the compressed friction material from the die cavity.

The apparatus and method of the invention provides efficient manufacturing of brake pads of various shapes, sizes, and materials.

DESCRIPTION OF THE PREFERRED EMBODIMENTS

Figure 1:
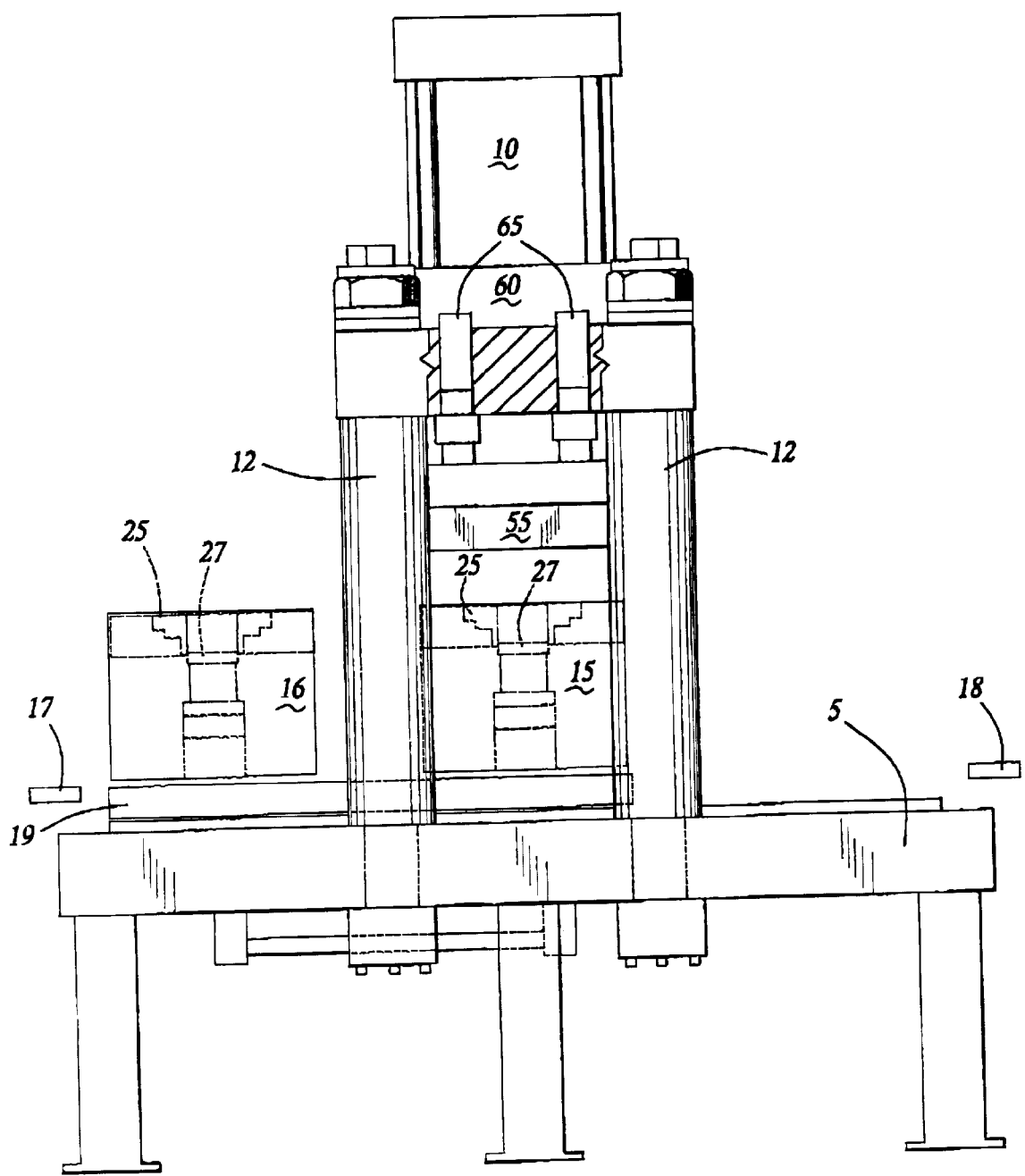
FIG. 1 is an elevation view showing an apparatus according to the invention, and also for carrying out the method of the invention.
Figure 2:
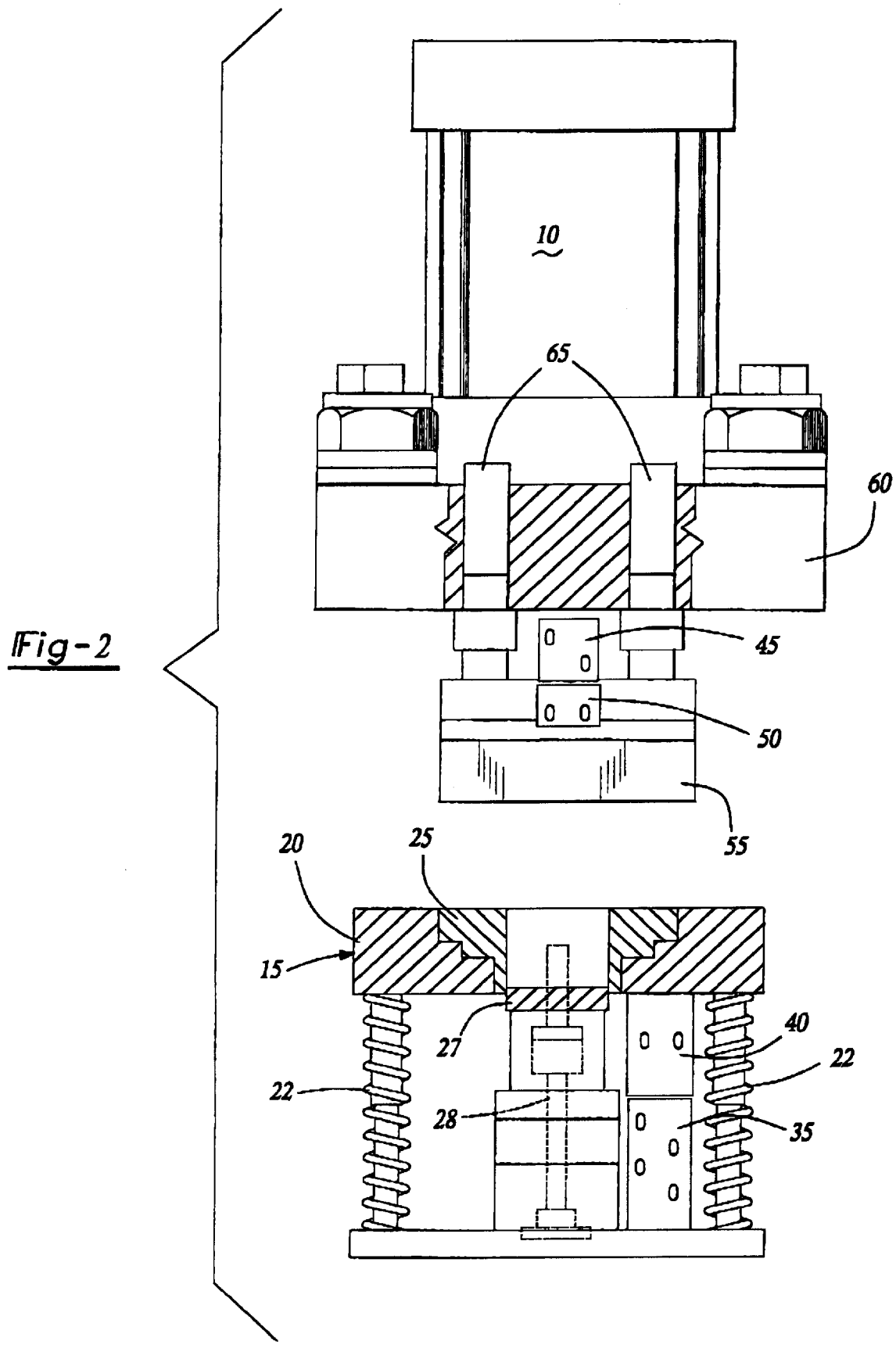
FIG. 2 is an elevation view as FIG. 1, but showing further detail of the press cylinder unit and the mold unit.

Referring to the drawings in FIGS. 1 and 2, a press apparatus for manufacturing friction brake pads is described according to the present invention. As used herein, the term "friction brake pad" is used to refer to any positive-molded friction component for use in brakes, including disc brake pads, drum brake shoes, as well as any other configuration of molded friction material. The press apparatus described in FIGS. 1 and 2 comprises a press frame 5, on which the various components of the apparatus are directly or indirectly mounted. Support rods 12 are vertically mounted on the press frame 5, and have mounted on them the press cylinder unit 10. Right mold unit 15 and left mold unit 16 are mounted on shuttle plate 19, which is slidably mounted on the press frame 5 so that the mold units may slide into and out of position under the press cylinder unit 10. Die carrier proximity sensors 17 and 18 sense which die carrier is not in position under the press cylinder unit 10.

Referring to FIG. 2, which illustrates a similar view of the apparatus as FIG. 1, but which provides more detail of the press cylinder unit and associated parts and of the mold unit and associated parts, it can be seen that the mold unit 15 comprises a die carrier 20 mounted on spring support rods 22. The die carrier 20 is adapted to hold a removable die 25 having a die cavity 30 adapted to receive the compressible friction material composition. The mold unit also comprises a punch 27, a die position proximity switch sensor 35 having a plurality of sensor nodes and associated die position proximity switch target 40. The die cavity 30 is defined on the sides by the internal walls of the die and at the bottom by the top surface of the punch 27. The die carrier 20 has attached thereto one or more die position cylinder(s) 28, which are used to adjust the height of the die carrer 20 and associated die 25 during operation of the apparatus. The die carrier 20 and punch 27 may also include heating means, such as electric heaters, steam tubes, or hot oil tubes, for applying and controlling the heat to which the friction material is subjected during processing.

Attached to the press cylinder unit 10 is a top bolster 60. Also attached to the press cylinder are guide posts 65, and a heated top plate 55, which moves up and down on the guide posts 65 in response to movement of a press piston (not shown) from within the press cylinder unit 10. The position of the press piston can be determined by output from a press ram proximity switch sensor 45, and press ram proximity switch target 50. The sensor 45 has a plurality of sensor nodes that enable it to determine the position of the target 50.

During operation of the press apparatus, the shuttle plate 19 slides from side to side so that while one mold unit is in proximity to the press cylinder unit 10 being subjected to molding, the die in the other mold unit is being filled with compressible friction material composition. It should be noted that although FIGS. 1 and 2 show the mold unit in proximity to the press cylinder unit 10 as directly below it, in alternative embodiments, the mold unit in proximity may be directly above the press cylinder unit 10.

Prior to introduction of the compressible friction material to the mold, the height of the die is first adjusted in response to one or more of: (a) the position of the die relative to the punch as determined by output from the die position proximity switch sensor 35 and die position proximity switch target 40, (b) operator input, or (c) characteristics or amount of either the compressible friction material in the die cavity, the desired compressed friction material, or both. These inputs can be directed through a programmable controller or a computer, which, in addition to controlling the height of the die, may also control many other parameters, such as piston stroke cycle time, temperature, pressure, and the like. To control the adjustment of the die position, the operator may input a desired position directly, or may provide input to a programmable controller, which will determine the appropriate die position. For example, an operator may enter a code for a particular configuration and friction material formulation, and the programmable controller will compare a predetermined desired die position setting to the position the die is already in, and then adjust the position as necessary. Alternatively, the operator may input information about the compressible friction and the component to be manufactured, such as the loose fill volume, final product density, and brake shoe plate thickness, and the programmable controller can utilize preprogrammed control algorithms to determine the optimum position to which the die should be set. Again, the programmable controller would compare the optimum position to the position the die is already in, and adjust as necessary. In certain alternative embodiments, the programmable controller could receive densor input on the characteristics of the compressible friction material, the shoe plate thickness, and the like, and factor those characteristics into a calculation of the optimum die position.

Figure 3:
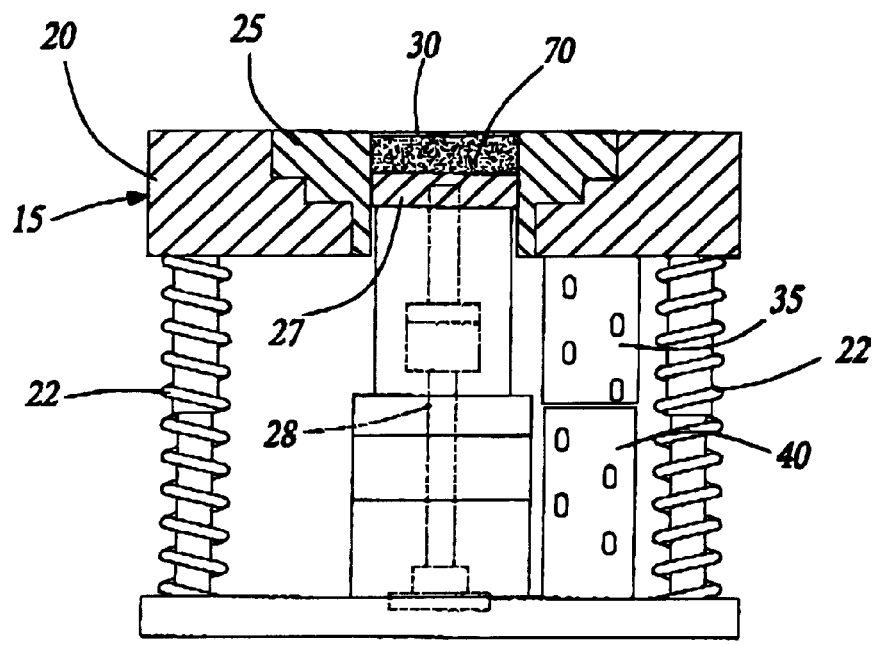
FIG. 3 is an elevation view of the mold unit with the die height set at a relatively high position to accomodate a relatively high volume of loose friction material in the die cavity.
Figure 4:
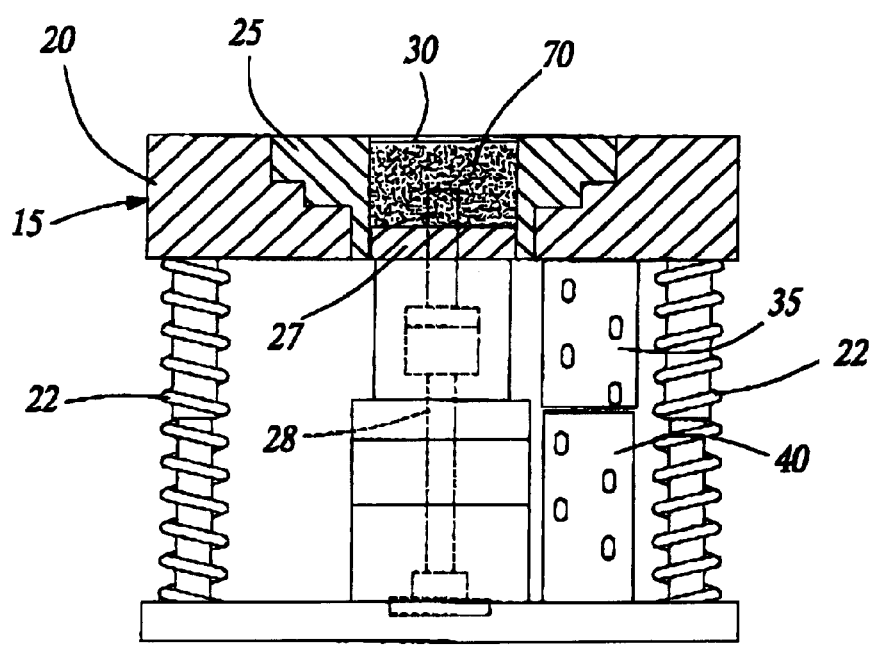
FIG. 4 is an elevation view of the mold unit with the die height set at a relatively low position to accomodate a relatively low volume of loose friction material in the die cavity.

In a preferred embodiment of the invention, the height of the die is adjusted so that the desired amount of compressible friction material will fill the die cavity 30 to a level even with or slightly below the top of the die 25. For example, as illustrated in FIG. 3, if the friction material composition is highly compressible and/or if a relatively thick part is to be molded, then the height of the die will be set relatively high to accomodate the desired volume of compressible friction material 70 so that it nearly fills the die cavity 30. In another example, as illustrated in FIG. 4, if the friction material composition is relatively uncompressible and/or if a relatively thin part is to be molded, then the height of the die will be set relatively low to accomodate the desired volume of compressible friction material 70 so that it nearly fills the die cavity 30.

The invention provides for efficient operation by shortening the press cycle time because for situations where the amount of compressible friction material occupies a relatively low volume, the press does not have to compress through the unused space within the die cavity 30. In addition, any operator interface involved in filling and/or leveling the compressible friction material in the die cavity is made easier because the die cavity is always filled to near the top. In a preferred embodiment, additional efficiencies can be achieved by adjusting the home position of the press piston, depending on the height to which the die carrier 20 is adjusted, to provide the minimum acceptable clearance between the heated top plate 55 and the top of the die carrier 20, which further minimizes the length of the piston stroke required in order to operate the press. When the die carrier is in a relatively high position, the home position of the press piston should be set relatively high as well, and vice versa. Adjustment of the home position of the press piston may be accomplished by conventional means, such as by closing a feed and/or exit valve in the hydraulic fluid system when the desired position is reached.

The apparatus shown in FIGS. 1–4 describes a particular embodiment of the invention, which is, in many cases, preferred. However, other embodiments may also be employed. For example, a linear transducer or a series of contact limit switches may be used instead of non-contacting proximity switches to determine the position of the die carrier 20 or the press piston, or an electric motor plus position encoder may be used (although not necessarily preferred) instead of a fluid-displaceable piston to adjust the position of the die carrier.

What is claimed is:

1. An apparatus for manufacturing brake friction pads, comprising:
   (A) a press frame,
   (B) a press cylinder unit mounted on the press frame, comprising
       (1) a cylinder, and
       (2) a press ram that is fluid-displaceable within the cylinder, and
   (C) a mold unit mounted on the press frame comprising
       (1) a die having a cavity adapted to receive compressible friction material, the die being movable in the same direction as the action of the fluid-displaceable press ram,
       (2) a punch adapted to fit within the die cavity, and
       (3) sensing means for determining the position of the die relative to the punch, and
       (4) means for automatically adjusting the position of the die relative to the punch in response to input from one or more of:
           (a) the sensing means (C)(3) for determining the position of the die relative to the punch,
           (b) operator input,
           (c) characteristics or amount of either the compressible friction material in the die cavity, the desired compressed friction material, or both.

2. An apparatus according to claim 1 wherein the sensing means (C)(3) is a proximity switch.

3. An apparatus according to claim 1 wherein the sensing means (C)(3) is a linear transducer.

4. An apparatus according to claim 1 wherein the adjusting means (C)(4) is a cylinder and fluid-displaceable piston.

5. An apparatus according to claim 1 wherein the press cylinder unit (B) further comprises sensing means (B)(3) for determining the position of the press ram.

6. An apparatus according to claim 5 wherein the sensing means (B)(3) is a proximity switch.

7. An apparatus according to claim 5 wherein the sensing means (B)(3) is a linear transducer.

8. An apparatus according to claim 5 wherein the press cylinder unit (B) includes means for adjusting the home position of the fluid-displaceable press ram in response the position of the die.

9. An apparatus according to claim 1 wherein the press cylinder unit further comprises a heated plate on the surface of the ram facing the die.

10. An apparatus according to claim 1 wherein the mold unit is movable in a direction transverse to the action of the fluid-displaceable press ram.

11. An apparatus according to claim 10 wherein the apparatus comprises two mold units movable in a direction transverse to the action of the fluid-displaceable press ram, said mold units mounted on a sliding shuttle so that during operation of the press, the mold units alternate in the position under the press cylinder unit.

12. A method of manufacturing brake friction pads, comprising the steps of:
    (i) providing a compressible friction material for introduction into a die cavity in a mold unit comprising
        (1) a die having a cavity adapted to receive the compressible friction material, the die being movable in the same direction as the action of a fluid-displaceable press ram to be located in proximity to the die, and
        (2) a punch adapted to fit within the die cavity,
    (ii) determining the position of the die relative to the punch,
    (iii) automatically adjusting the position of the die relative to the punch in response to input from one or more of:
        (a) the position of the die relative to the punch determined in step (ii),
        (b) operator input,
        (c) characteristics or amount of either the compressible friction material in the die cavity, the desired compressed friction material, or both,
    (iv) introducing the compressible friction material into the die cavity,
    (v) positioning the mold unit in proximity below the fluid-displaceable press ram,
    (vi) compressing the compressible friction material in the die cavity against the punch with the fluid-displaceable press ram, and
    (vii) removing the compressed friction material from the die cavity.

13. A method according to claim 12 wherein the the position of the die relative to the punch sensing means is determined in step (ii) with a proximity switch.

14. A method according to claim 12 wherein the the position of the die relative to the punch sensing means is determined in step (ii) with a linear transducer.

15. A method according to claim 12 wherein the position of the die relative to the punch is adjusted in step (iii) with a cylinder and fluid-displaceable piston.

16. A method according to claim 12, further comprising the step of determining the position of the fluid-displaceable press ram and adjusting the home position of the fluid-displaceable press ram in response to the position of the die set in step (iii).

17. A method according to claim 16 wherein the position of the fluid-displaceable press ram is determined with a proximity switch.

18. A method according to claim 16 wherein the position of the fluid-displaceable press ram is determined with a linear transducer.

19. A method according to claim 12 wherein the fluid-displaceable press ram includes a heated top plate on the surface of the ram facing the die.

20. A method according to claim 12 wherein the mold unit is moved in a direction transverse to the action of the fluid-displaceable press ram in order to position the mold unit in proximity below the fluid-displaceable press ram.

21. A method according to claim 20, further comprising the step of moving said mold unit and a second mold unit in a direction transverse to the action of the fluid-displaceable press ram, said mold units mounted on a sliding shuttle so that during operation of the press, the mold units alternate in the position under the press cylinder unit.

* * * * *